(12) United States Patent
Dakua

(10) Patent No.: US 9,741,018 B2
(45) Date of Patent: Aug. 22, 2017

(54) SYSTEMS AND METHODS FOR EXTRACTING SIMILAR GROUP ELEMENTS

(71) Applicant: eBay Inc., San Jose, CA (US)

(72) Inventor: Priyavrath Dakua, Bangalore (IN)

(73) Assignee: eBay Inc., San Jose, CA (US)

( * ) Notice: Subject to any disclaimer, the term of this patent is extended or adjusted under 35 U.S.C. 154(b) by 256 days.

(21) Appl. No.: 14/526,231

(22) Filed: Oct. 28, 2014

(65) Prior Publication Data

US 2016/0117398 A1  Apr. 28, 2016

(51) Int. Cl.
*G06F 17/30* (2006.01)
*G06Q 10/10* (2012.01)

(52) U.S. Cl.
CPC ....... *G06Q 10/10* (2013.01); *G06F 17/30675* (2013.01); *G06F 17/30867* (2013.01)

(58) Field of Classification Search
CPC ............... G06F 17/30675; G06F 17/30867
USPC ......................................................... 707/709
See application file for complete search history.

(56) References Cited

U.S. PATENT DOCUMENTS

| 6,154,213 A | 11/2000 | Rennison et al. |
| 7,984,047 B2 | 7/2011 | Sukman |
| 2008/0059486 A1 | 3/2008 | Pappas |

OTHER PUBLICATIONS

"International Application Serial No. PCT/US15/57317, International Search Report mailed Dec. 29, 2015", 2 pgs.
"International Application Serial No. PCT/US15/57317, Written Opinion mailed Dec. 29, 2015", 5 pgs.

*Primary Examiner* — Shahid Alam
(74) *Attorney, Agent, or Firm* — Schwegman Lundberg & Woessner, P.A.

(57) ABSTRACT

Techniques for extracting similar group elements are described. In one embodiment, a received communication is analyzed for repeating patterns in the elements within the communication. An input may be received via a user interface identifying a particular element of the received communication. A system may then identify a particular position within a repeating pattern that is associated with the particular element. Every element within the communication that is in the same position within the repeating pattern may then be identified, stored, or output in a specified or preselected format. Various embodiments may account for multi-page response communications, various pattern recognition techniques, and automated or user-assisted systems.

17 Claims, 7 Drawing Sheets

SYSTEMS AND METHODS FOR EXTRACTING SIMILAR GROUP ELEMENTS

TECHNICAL FIELD

The present application relates generally to the technical field of pattern recognition and data extraction, and in particular, to systems and methods for identifying repeated patterns in a network communication and extracting data elements from the repeated pattern structure.

BACKGROUND

The size and complexity of the Internet and various wide and local area networks have grown as communication and computing technology have advanced. Web crawlers, web scrapers, and web rippers are tools for gathering information from a network. Many current web crawler and web scraping tools gather all available information from a target content source such as a content server. While this provides information about the content source, the information is unfiltered and the amount of information may be unnecessarily large, depending on the purpose that the information is being gathered for. Other web crawler and web scraping tools may search for targeted information, but search only for specifically identified information, and may miss other types of information, Systems, devices, and methods described herein provide improved tools for extracting information from a network.

DESCRIPTION OF EMBODIMENTS

Figure 1:
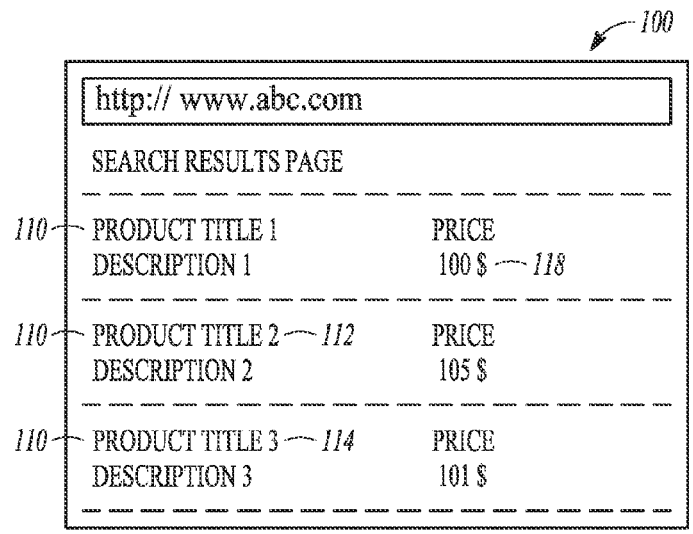
FIG. 1 illustrates aspects of a product search result communication in accordance with certain embodiments.

Embodiments described herein relate to pattern recognition and data extraction, and in particular, to systems and methods fir extracting similar group elements from a web page or product search result communication which has a repeating structure.

For example, in one embodiment, a system user may want to gather information about toy cars. In response to an input, the system may send a query to a network resource for information about toy cars. When a list of 217 products with associated prices is returned, the user may select a single price and a single name for a first toy car. The system will then automatically analyze the structure of the listing to identify a structure that is repeated for each of the 217 toy car listings. The system will further use this structure information to extract the name and price for each of the 217 toy cars in the list based on the input to the system selecting the single price and single name for the first toy car. This information may then be automatically structured into a table or a database and stored in a system memory.

As an additional example, in certain embodiments, a system user may wish to gather pricing information about a certain product type from a network resource. The system may send a product search request to a web resource, and receive a listing of products and associated prices. Any number of products may be described in a single search result, and for search results with hundreds or thousands of products listed, parsing through the communication to identify the desired information for each product may be inefficient. If more than one product and price are listed in the product search result communication, the communication may have a structure that repeats for each product. This structure may include, for example, nodes for a name, a photograph, a description, a sales source, a price, and any other such information. Instead of individually searching through the entire communication to extract the desired information, embodiments described herein analyze the product search result communication to identify the structure that repeats for each product. The system may receive an input identifying a single element of information from a single product as the desired information. Embodiments may then identify a common parent node and an element selection cascading style sheet within the repeating pattern that is associated with the selected element of information. The system may then use the structure information to extract related element information for each product.

Web rippers, web crawlers, and web scrapers are systems for browsing networks to gather information. They may be used, for example, to download and store information from each website visited for analysis and processing. A web crawler, for example, starts with a list of uniform resource locators (URLs) to visit, identifies all links in pages associated with those URLs, and then proceeds to gather information from visited pages. Web scrapers may use similar tools to gather website information, and then may take unstructured information from different network sources and gather the information into a structured format or a database. Such operations, however, either gather all of the available information, or search through all of the available information to extract specifically desired information.

In many networked systems, there are structures or barriers to prevent certain types of automated scraping or ripping, in certain environments, scraping or ripping communications may take up a significant portion of a network's available bandwidth, and add significant costs to a network resource provider. Fully automated processing of information from such network resources by processing the entire contents of communications may thus be impractical or inefficient. Manual examination of large lists by a user, however, is also inefficient, especially for large amounts of data. Embodiments described herein may provide improvements by providing a human user with an automated system for extraction of large amounts of information based on manual examination of a single data listing which is in a structure that is repeated within the large amounts of information. Embodiments may further enable efficiencies in automated systems by using an identified structure to gather information using fewer processing resources.

References are made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 illustrates an example of a first product search result communication 100. The first product search result communication 100 may include a URL, product elements, formatting structures, advertising information, column titles, and any other such information. This information may include additional details of products, such as photographs, illustrations, links to product documents, and such, particularly as examples of product elements that may be included in a first product search result communication 100. As shown in FIG. 1, the first product search result communication 100 includes a plurality of product elements 110. A product price element 118 of the plurality of product elements 110 is specifically identified. A first product element 112 and a second product element 114 are also particularly identified, and are part of the plurality of product elements 110. Product elements 110 may include any information that is associated with a particular response to a search request that resulted in the first product search result communication 100. For example, if a search request or search query was initiated for automobiles that resulted in the first product search result communication 100, any information associated with particular automobiles that were identified in response to the search would be product elements 110. Additional implementations may include other information, such as header information, branding colors and symbols associated with a search engine or a sales portal, sizing information, or other such optional information.

The first product search result communication 100 may be displayed on an output display of a system. Any user interface elements or other aspects of a webpage which are created and displayed in response to receipt of the first product search result communication by a system are considered elements that are associated with the first product search result communication 100.

Figure 2:
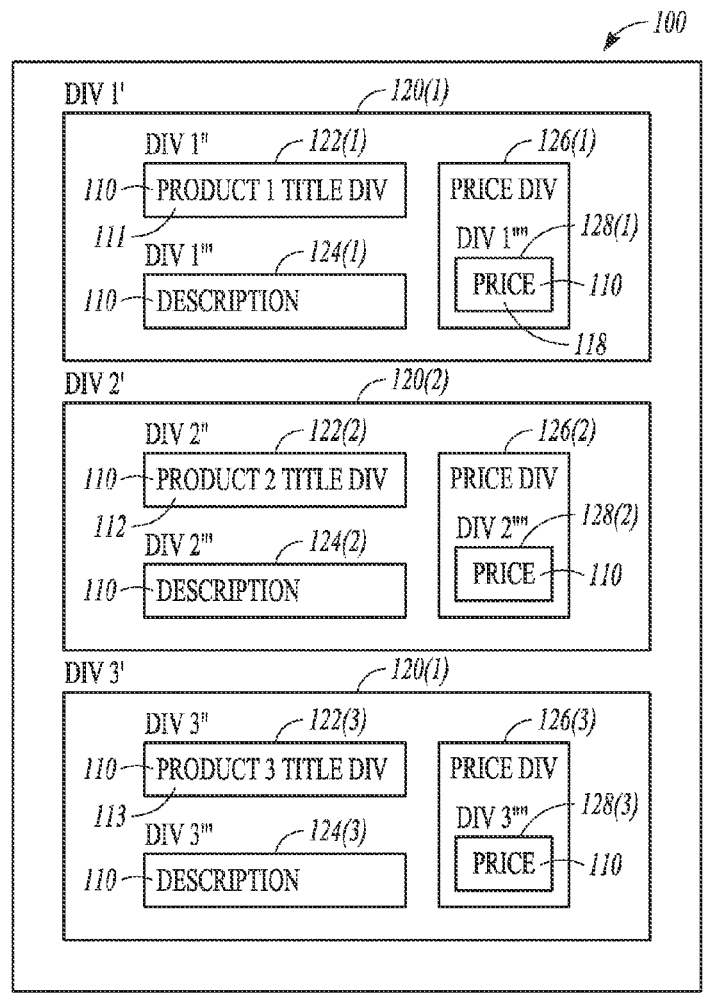
FIG. 2 illustrates aspects of a product search result communication in accordance with certain embodiments.

FIG. 2 shows additional aspects of the first product search result communication 100. This includes product elements 110. Product elements 110 include a number of different content information elements. In certain embodiments, product elements 110 may include all content information in first product search result communication 100. In other embodiments, only a portion of the content information elements in first product search result communication 100 are included in product elements 110. A number of specific product elements 110 are particularly identified, including product element 111, product element 113, product price element 118, first product element 112, and second product element 114. In various embodiments, product information provided in product elements 111-118 may include photographs of a product, a product name, a product description, and any other such product information. FIG. 2 also shows the repeated structure which is part of the first product search result communication 100. As illustrated by FIG. 2, the repeated structure also includes internal structural elements.

The top-level repeated structure is shown as position node 120. This structure is repeated three times in FIG. 2 as position nodes 120 (1-3). In various embodiments described herein, such a top-level repeated structure may be referred to as a top-level node, a top position node, or a top-level position of the repeated structure. Certain communications may have a single top-level node. Other embodiments may have multiple different repeated structures, and so embodiments may have multiple top-level nodes. In certain implementations, at top level node may describe a "container" or "structure" for the largest repeating structure of a given set of information. Embodiments with multiple top-level nodes may thus have multiple different structures with different sets of repeating information.

Each position node 120 of FIG. 2 includes additional position nodes within the structure of position node 120. These are shown as position node 122, position node 124, position node 126, and position node 128. Additionally, position node 128 is further structured as being inside of position node 126. Each of these position nodes 122, 124, 126, and 128 are repeated inside of each position node 120. Therefore position node 120 (3) includes position nodes 122(3), 124(3), 126(3), and 128(3). Position nodes which do not include an additional node as part of an internal structure may be referred to as bottom-level nodes, bottom position nodes, or bottom-level positions of the repeated structure. In FIG. 2, position nodes 122, 124, and 128 are bottom-level nodes.

The actual content of the first product search result communication 100 includes the product elements 110. As the repeated structures are identified, each product element of product elements 110 may be associated with a position node. As shown in FIG. 2, product price element 118 is associated with position node 128 (1), first product element 112 is associated with position node 122 (2), and second product element 114 is associated with position node 124 (3). Additional product elements will similarly be associated with other position nodes.

Figure 3:
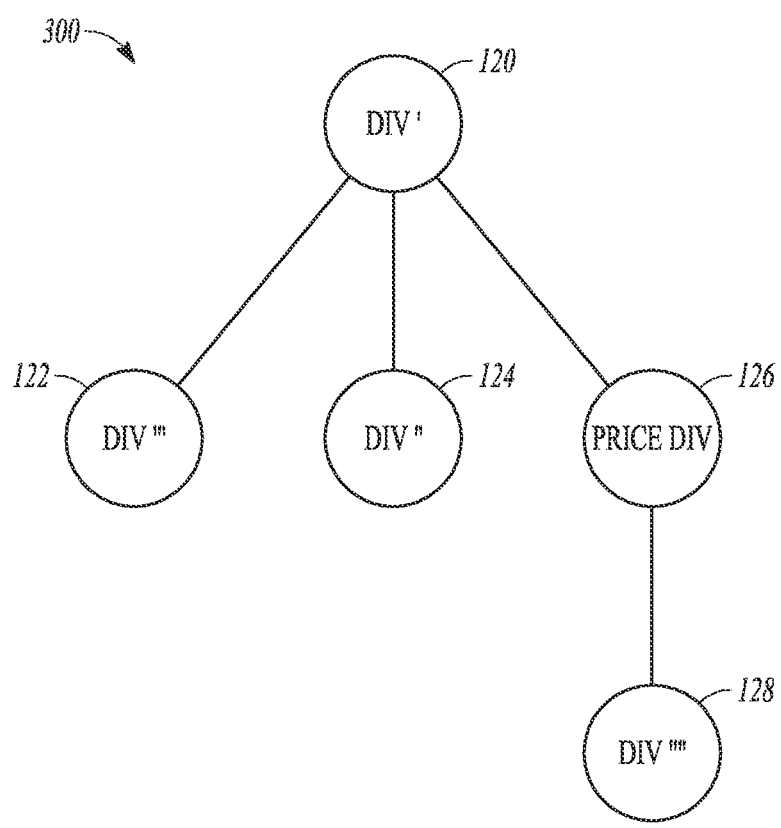
FIG. 3 illustrates aspects of a product search result communication in accordance with certain embodiments.

FIG. 3 shows a repeated structure 300 which may be identified from the first product search result communication 100. This repeated structure includes top position node 120, position node 122, position node 124, position node 126, and position node 128. In various embodiments, communications that are received by a system may include any complexity of repeated structure. While the embodiment of FIG. 3 shows top-level position node 120 with 2 levels of complexity beneath, any number of levels may be included in different embodiments. A first level beneath position node 120 includes position nodes 122, 124, and 126. A second level beneath position node 120 includes position node 128. Pricing divisions are particularly called out here as a type of product information that may be key information that is regularly identified, but pricing position nodes may be treated the same as other position nodes in some embodiments. Additional embodiments may include position nodes at a third level, a fourth level, or any number of levels. Similarly, a level may include any number of position nodes within the level.

Further, embodiments may account for communications which include multiple top-level nodes. For example, if a communication includes a first repeated structure and a second repeated structure, each repeated structure will include its own top-level position node.

In certain embodiments, only bottom-level nodes will be associated with elements that contain text or other such information. In such embodiments, the nodes above the bottom-level nodes will be associated with relative positions or relationships among the bottom-level nodes. For example, in FIG. 2, position node 126 simply identifies a pricing characteristic that is associated with bottom-level position node 128. Similarly, position node 120 identifies the relationship between lower level position nodes 122, 124, and 126. The position nodes 120 through 128 thus describe the repeated structure of the first product search result communication 100. In other embodiments, any position node may include both information content and associations with other position nodes. For example, in certain embodiments, position node 126 may include a label or other information.

A label as referred to herein is an element that is repeated as part of a structure in a received communication, but that does not change between different product elements which are associated with the same position node.

Information content as referred to herein describes text, pictures, videos, graphics elements, or any other informational element of a received communication. This includes any content information in response to a search query that initiated the communication response.

Positional information as described herein refers to information about the relationships between product elements that define or make up an identifiable repeated structure which may be used to define position nodes. This includes a physical position of product elements on an output display that is presented in response to receipt of a communication, such as the first product search result communication 100. This may also refer to relationships defined within the received communication, such as relationships identified by hypertext markup language (HTML) text, extensible markup language (XML) text, or other information or metadata in a received communication that provides information about relationships between product elements in the received communication.

Figure 4:
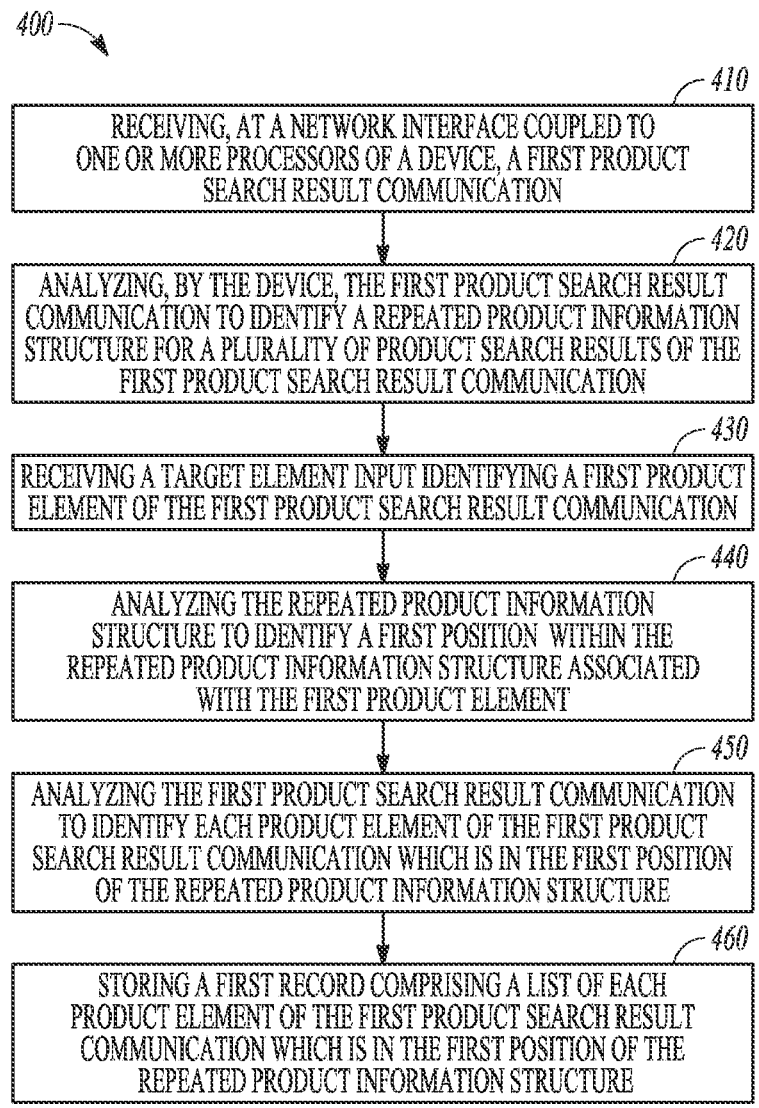
FIG. 4 illustrates a method for extracting group elements, according to certain embodiments.

FIG. 4 describes a method 400 for extracting similar elements from a communication, in accordance with one embodiment. In various implementations of the embodiment of FIG. 4, the method may be performed by a computing device such as the device 500 of FIG. 5, the server 602 of FIG. 6, or the machine 800 of FIG. 8. In other implementations, a system of devices may be used, or any other such device, virtual device, or system of devices may be used for any part of the method of FIG. 4.

The method 400 of FIG. 4 begins with receiving, at a network interface coupled to one or more processors of a device, a first product search result communication, in operation 410. This may be in response to a search query that was input at the device by a user and communicated to a content server. This may also be in response to a search query that was automatically generated by the device and sent to a content server. This may also be an information push from a networked content source to a device without an initiating query made by the device.

The method proceeds in operation 420 with analyzing, by the device, the first product search result communication to identify a repeated product information structure. This repeated product information structure may be similar to repeated structure 300 of FIG. 3. Each repetition of the structure includes information about a different single product or set of products, and may be considered a single search result that is part of a plurality of product search results of the first product search result communication. A product search result communication may include any number of individual search results listed in any format, with at least a portion of the search results sharing one or more repeated structures. Each product search result of the plurality of product search results includes one or more product elements such as product elements 110 of FIG. 2. Further, each of the product elements has a position or position node within the repeated product information structure. In other words, the first product search result includes a list of products. The products may be goods, services, groups of goods and/or services, or any other such list of search results. Each product listed in the list of products may have associated content information such as a picture, a text description, a title description, a price, or any other such content information. The content information associated with each product may be structured in a particular way, with at least a subset of the products in the list of products having the same structure for the content information.

In operation 430, the method involves receiving a target element input. The target element input may be a user input from an input source such as keyboard 628 of FIG. 6. In other embodiments, a target input may be received from any other such user input device, such as a touchscreen, a camera, a mouse, a speaker, or any other such sensor. In other embodiments, the target element input may be a predetermined automatic input received from a device memory or an element selection module as part of the operation of a system. The target element input identifies or is used to identify a first product element of the first product search result communication.

Operation 440 involves analyzing the repeated product information structure to identify a first position within the repeated product information structure associated with the first product element. Thus, the target element input identifies a first product element, and the operation 440 involves identifying where that identified first product element is positioned or structured within a repeated structure that is part of the first product search result communication.

Operation 450 involves analyzing the first product search result communication to identify each product element of the first product search result communication which is in the first position of the repeated product information structure. For example, in the embodiment described in FIGS. 1-3, if the target element input identifies first product element 112, operation 450 would comprise analyzing a position associated with first product element 112 to associate position node 122 with first product element 112. The analysis would then further identify product elements 111 and 113 as also being associated with position node 122, so that product elements 111, 112, and 113 are identified as all product elements of the first product search result communication 100 which are in the identified position of the repeated structure 300 of FIG. 2. If, for example, another embodiment included 1000 product listings with repeated structure 300, then all 1000 associated product elements from associated position nodes 122 would be identified by this analysis.

In certain embodiments, the first product search result communication may include a cascading style sheet. For such embodiments, elements within the communication may be associated with the cascading style sheet. When the target element input is received, a repeating pattern may be identified using information from the cascading style sheet, and each element that shares a node position or group with the element identified from the target element input may then be derived using information from the cascading style sheet.

In certain embodiments, all of the product listings may not be presented on a single page of a graphic user interface, or all of the product listings associated with a single query that resulted in a response communication may not be sent in a single product search response communication. In such embodiments, an analysis of the repeating structure may also identify a continuing list indicator. Such a continuing list indicator may be a selectable input in a graphic user interface, information within a communication, or some other such indicator. Various embodiments may deal with such an indicator in different ways. Certain embodiments may automatically request the additional information upon display of the communication at the graphic user interface. Certain embodiments may first receive a target element input, analyze the structure of the currently presented product information, and then request authorization from a user to request additional information using the continuing list indicator. In other embodiments, the request for additional information using the continuing list indicator may be performed automatically. A continuing product search result communication may then be received in response to the automatic request for the additional product listings, and the additional product listings from the continuing product search result communication may then be analyzed to identify the repeating structure within the continuing product search result communication. Further, a continuing product search result communication may itself include a second continuing list indicator. In various embodiments, each continuing product search result communication may require a separate target element input. In other embodiments, the first target element input may be used for each continuing product search result communication. The system may continue automatically requesting first, second, third, and so on continuing search result communications until the last continuing search result communication does not include a continuing list indicator. In other embodiments, a first request for a continuing product search result communication may require a user confirmation presented via a user interface, and then each subsequent request for a continuing product search result communication may be performed automatically. After the last communication is received, all the extracted information from each communication may be aggregated into a single record and stored for later analysis, aggregated and presented to a user in a selected or predetermined format, or aggregated and communicated automatically to a separate device. For example, the record may include a list of nodes in a text format, a graphical representation of repeated structures identified in a communication, and/or a table of products with one or more product elements associated with each product in the table. In certain embodiments, the record may comprise a spreadsheet with one column for a product name, one column for product description, and one column for a product price, with each of the columns being associated with a node in a repeated structure that was identified as part of a received communication.

In certain embodiments, a position node may be empty for certain product listings in a product search result communication. Such empty product elements may either be identified as null product elements, given a standard 0 or "empty" value, or excluded from the stored record that is created in operation 460.

Operation 460 involves storing a first record comprising a list of each product element of the first product search result communication which is in the first position of the repeated product information structure. This record may be stored locally on the device, or may be communicated to a remote database or storage device.

Although the method of FIG. 4 describes operations 410 through 460 in a certain order, it will be apparent that certain processes may be conducted in a different order. For example, in certain embodiments, the target element may be received (operation 430) before the communication is analyzed (operation 420.) In certain example embodiments, the receipt of the target element input may be used as a trigger to begin analysis of the communication. In other embodiments, and other processes may similarly occur in a different order in accordance with implementations of the different embodiments. In other embodiments, a separate input initiating the analysis of the first product search result communication may be received with the target element input or after the target element input is received. In other embodiments, the analysis to generate the repeated product information structure may be initiated automatically in response to the receipt of the first product search result communication at operation 410. In still further embodiments, a user input or a separate automatic trigger may be used to initiate the analysis for identifying the repeated product information structure at any time prior to operation 440.

Figure 5:
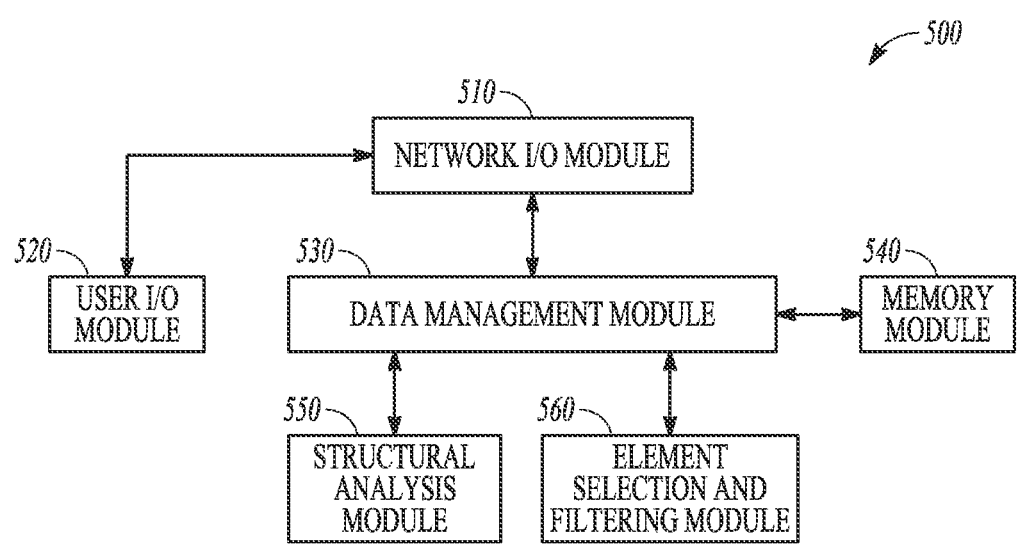
FIG. 5 illustrates aspects of a device that may extract group elements, according to certain embodiments.

FIG. 5 illustrates a device 500 that may be used as part of systems, devices, and methods for extracting similar group elements in accordance with certain embodiments described herein. Device 500 includes network input/output (I/O) module 510, user input/output (I/O) module 520, data management module 530, memory module 540, structural analysis module 550, and element selection and filtering module 560. Network input/output module 510 may include any network interface device, system, or components that may be used to receive a communication from a network content source. This may include elements such as communications interface 620 of FIG. 6, network interface device 820 of FIG. 8, or any other such wired or wireless network communication system.

User input/output module 520 includes input elements such as a keyboard 628, alphanumeric input device 812, or cursor control device 814. In certain embodiments, user inputs may also be received via network input/output module 510. User input/output module 520 may also include other devices such as a camera input, speaker input, touchscreen, or any other such user input devices. User input/output module 520 may also include output devices such as a screen that may be used to output a webpage derived from a received communication such as the first product search result communication described above. Output devices may include multiple displays, speakers, or any other such output device.

Data management module 530 includes communication paths such as bus 808, communication bus 630, or any other such communication path. Data management module 530 may also include one or more processors such as central processing unit 622, processor 802, or any other general or special purpose processing circuitry that may be used to implement extraction of similar group elements according to the embodiments described herein.

Memory module 540 includes any memory device for storing information that may be used by the device 500 to implement aspects of extracting similar group elements. This may include information received as part of a product search result communication. This may include aspects of a search query that initiated a product search result communication as a response. This may also include aspects of various systems and modules that may be used to perform structural analysis and element selection and filtering by structural analysis module 550 and element selection and filtering module 560. In certain embodiments, structural analysis module 550 and element selection and filtering module 560 may perform certain operations of the methods described above. This is discussed in more detail below. This may include templates, instructions, or any other such information that may be used by a system. Memory module 540 may also store an output record that is generated by the systems and methods for extracting similar group elements described herein. Such records may include metadata structures and content which describe extracted data elements in addition to the extracted elements. Such records may also include formatting for a particular output system, such as database formatting or spreadsheet formatting.

Structural analysis module 550 comprises any hardware, software, firmware, or combination of these as a system or module for analyzing the structure of a received communication. For example, structural analysis module 550 may process the first product search result communication described in FIGS. 1 and 2 to identify the repeated structure 300 of FIG. 3.

Structural analysis module 550 may accomplish this analysis in a number of different ways. In certain embodiments, HTML parsers may be used to identify repeated structures in a received communication such as the first product search result communication. Such an HTML parser may identify templates or patterns in HTML received as part of a communication, and may sort the patterns into a structure such as repeated structure 300. In other embodiments, another such parser may be used with any format of received communication to identify such patterns. In other embodiments, document object model parsing may be performed to create a document object model tree, and the pattern may be identified by repeating tree structures within the document object model tree. Such embodiments may use a browser with control systems as part of the parser to implement the analysis. In further embodiments, optimized search or recognition systems may use regular expression matching or analysis of metadata in order to identify repeating structures within a received communication. In embodiments where aspects of the received communication to be analyzed are known or partially known, optimized templates or versions of any of the analysis methods described above may be tailored to the expected or known aspects of the received communication.

Further still, certain embodiments may use interface ripping, user interface scraping, or analyzing an output display and associated user inputs to identify structures within a received communication. For example, when a communication such as the first product search result communication 100 is received, it may be displayed on an output screen as illustrated in FIG. 1. In certain embodiments, a user interface that is integrated with the display shown in FIG. 1 may accept a user input to identify one or more position nodes of the repeated structure.

In other embodiments, the received communication may be rendered for display on an output, and a computer vision system or a graphical analysis program may analyze the rendered output to identify patterns. The patterns may then be associated with product elements of the received communication to generate a repeating pattern, or the repeating pattern may be identified and created directly from the rendered output.

For example, in certain embodiments, an output display presents aspects of a first product search result communication. This may include graphically presented lines, text, and photographs that are associated with product elements of the first product search result communication. Information associated with the output display may be stored in a data structure. This may, for example, associate one grid element of the data structure with a pixel of the output display. Structural analysis module 550 may perform one or more pattern recognition algorithms to identify repeated patterns in the data structure, and to associate the patterns with product elements from the first product result communication. The identified patterns may then be used to identify nodes and as part of repeated structures.

Device 500 further includes element selection and filtering module 560. Element selection and filtering module 560 comprises hardware, software, firmware, or combination of these as a system or module for identifying an element in a received communication and extracting similar elements based on the structure identified by structural analysis module 550. For example, element selection and filtering module 560 may receive an automated target element input and use the automated target element input to identify an associated element within a received communication. Element selection and filtering module 560 may then further identify each element within the communication which shares the associated element's position within the repeating structure identified by structural analysis module 550.

In one embodiment, for example, element selection and filtering module 560 operates with a user interface on an output display to create a received communication output that may have an appearance similar to the appearance of the first product search result communication 100 as shown in FIG. 1. A system user may use the user interface to select a pixel or a group of pixels which are displayed as part of the user interface outputting the first product search result communication 100. Element selection and filtering module 560 may then use the selected pixel as a target element input, and a product element that is most closely associated with the pixel location may then be identified as a selected or associated element. In certain embodiments, a graphical indication on the user interface may be displayed in response to this selection. A user may then have an option to de-select this element and select another element, or to select additional elements.

Once an element is identified as a selected element, element selection and filtering module 560 may determine which node structure is associated with the selected element. Then, once the node structure associated with the selected element is identified, the received communication may be analyzed to identify every instance of the repeated structure within the received communication, and to further identify every instance of the node structure associated with the selected element. Similar to what is described above, when every instance of the node structure associated with the selected element is identified, the elements for each instance of the node structure may be highlighted or indicated on the output display. This process may be automated to occur directly following selection of the pixel or group of pixels, or may depend on a user confirmation after the pixel selection and before the identification of each instance of the node structure associated with the selected element.

In other embodiments, rather than a user interface accepting a user input to select pixels, an automated system may use one or more templates to select pixels in an output display or a rendered output data stream. In one embodiment, for example, a "$" pattern may be used to identify price elements such as product price element 118.

In still further embodiments, rather than relying on an output to a user interface or display, any matching technique described above for structural analysis module 550 may further be used to create a target element input and identify a selected element as described above.

One example of an alternate embodiment includes a network input/output interface coupled to the one or more processors that receives a first product search result communication. This embodiment further includes a structural analysis module that receives the first product search result communication from the network interface and analyzes the first product search result communication to identify a repeated product information structure for a plurality of product search results of the first product search result communication, wherein each product search result of the plurality of product search results comprises a plurality of product elements, and wherein each of the product elements has a position within the repeated product information structure The embodiment still further includes an element selection and filtering module that receives a target element input identifying a first product element of the first product search result communication, analyzes the repeated product information structure to identify a first position within the repeated product information structure associated with the first product element, and analyzes the first product search result communication to identify each product element of the first product search result communication which is in the first position of the repeated product information structure. Finally, the embodiment includes a memory module that stores a first record comprising a list of each product element of the first product search result communication which is in the first position of the repeated product information structure.

Alternate embodiments may include various combinations of elements described above in any computing device described herein.

Figure 6:
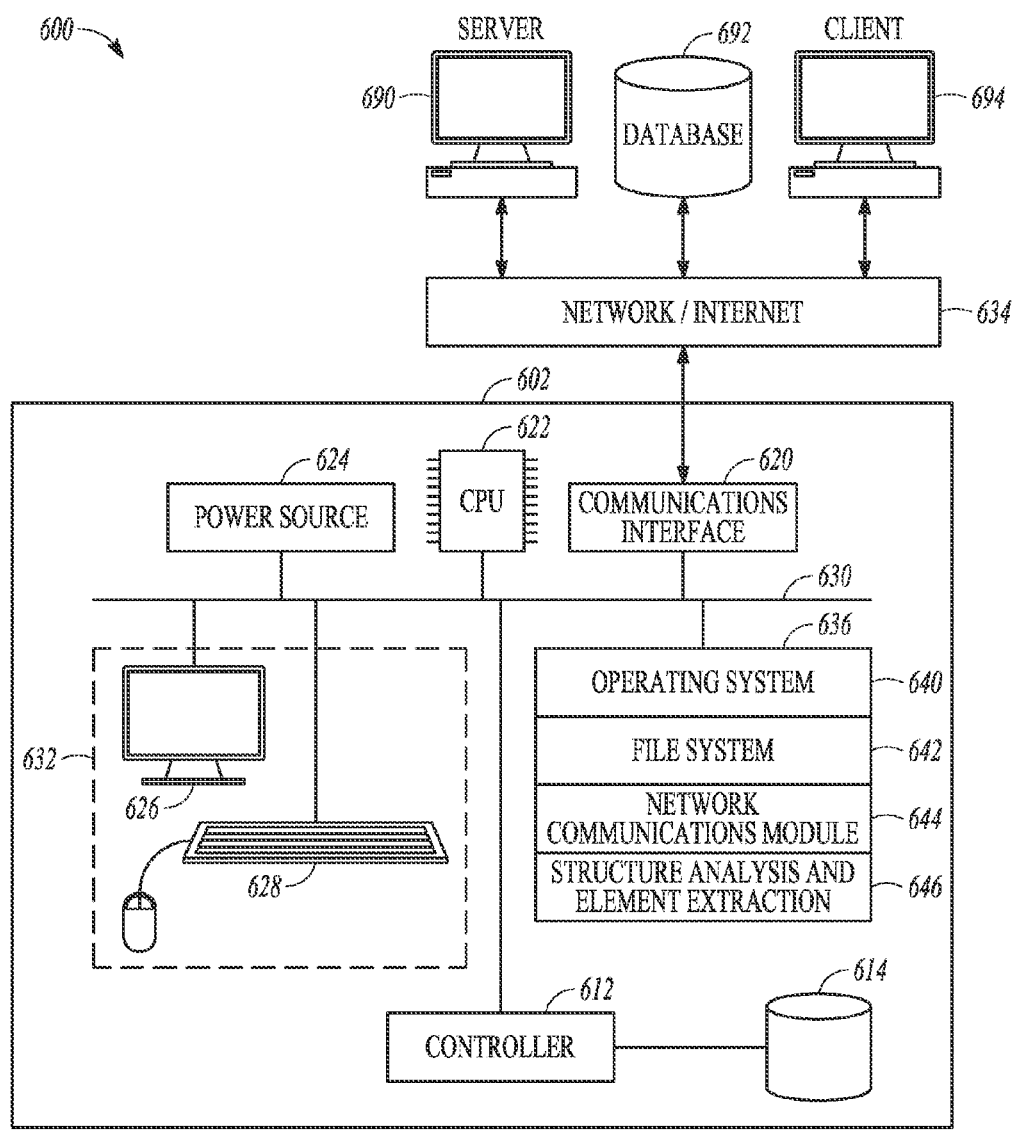
FIG. 6 illustrates aspects of a device that may extract group elements, according to certain embodiments.

FIG. 6 is a block diagram illustrating a system 600 in accordance with one embodiment of the present disclosure. For example, structure analysis and element extraction module 646 of FIG. 6 may be a combination of structural analysis module 550 and element selection and filtering module 560 of FIG. 5. Server 602 of FIG. 6 may thus, in some embodiments, be an implementation of device 500 of FIG. 5. As part of the operation of server 602 for certain implementations of extracting similar group elements, server 602 may receive a communication such as first product search result communication 100 from any of server 690, database device 692, or client device 694. Server 602 may then analyze the communication according to one of the methods described herein.

The system 600 includes a number of devices including server 690, database device 692, and client device 694 connected to server 602 via network 634 (e.g., the Internet). Any of these devices may be structured in whole or in part as a device described in FIG. 8. In certain embodiments, server 690, database device 692, or client device 694 may function as content devices that may provide content information to server 602 as part of a network communication.

Server 602 as shown includes one or more central processing units (CPUs) 622 for executing modules, programs, and/or instructions stored in memory 636 and thereby performing processing operations; one or more communications interfaces 620; memory 636; and one or more communication buses 630 for interconnecting these components. Communication buses 630 optionally include circuitry (e.g., a chipset) that interconnects and controls communications between system components. Server 602 also includes power source 624 and controller 612 coupled to mass storage 614. Server 602 optionally includes a user interface 632 comprising a display device 626 and a keyboard 628. In other alternative embodiments, server 602 may include alternate combinations of the elements described above, or may include additional elements not described here. Memory 636 may be high-speed random access memory, such as dynamic random-access memory (DRAM), static random-access memory (SRAM), double data rate random-access memory (DDR RAM), or other random access solid state memory devices, and may include non-volatile memory, such as one or more magnetic disk storage devices, optical disk storage devices, flash memory devices, or other non-volatile solid state storage devices. Memory 636 may optionally include one or more storage devices remotely located from the CPU(s) 622. Memory 636, or alternately the non-volatile memory device(s) within memory 636, comprises a non-transitory computer-readable storage medium. In some embodiments, memory 636, or the computer-readable storage medium of memory 636, stores the following programs, modules, and data structures, or a subset thereof: an operating system 640; a file system 642; a network communications module 644; and a structure analysis and element extraction module 646.

Structure analysis and element extraction module 646 may be implemented as part of server 602 to implement certain embodiments for extracting similar group elements as described herein. For example, structural analysis module 550 and element selection and filtering 560 of FIG. 5 may be implemented as part of structure analysis and element extraction module 646. In other embodiments, such a module may be implemented on multiple devices, and may be implemented in a server-only architecture with a server such as server 602 presenting an interface to a user on a client device 694, in a client-server architecture with aspects of the module operating partially on a client device 694 and partially on a server such as server 602, or as a client application with the entirety of the module operating on a client device such as client device 694 with no associated server 602.

The operating system 640 can include procedures for handling various basic system services and for performing hardware dependent tasks. The file system 642 can store and organize various files utilized by various programs such as a record created by extracting elements from a communication having a repeated structure as described above. The network communications module 644 can communicate with various devices via the one or more communications interfaces 620 (e.g., wired, wireless), the network 634, other wide area networks, local area networks, metropolitan area networks, and so on.

The network 634 may be any network that enables communication between or among machines, databases, and devices (e.g., the server 602 and the client device 694). Accordingly, the network 634 may be a wired network, a wireless network (e.g., a mobile or cellular network), or any suitable combination thereof. The network 634 may include one or more portions that constitute a private network, a public network (e.g., the Internet), or any suitable combination thereof. Accordingly, the network 634 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., Wi-Fi network or WiMAX network), or any suitable combination thereof. Any one or more portions of the network 634 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The server 602, server 690, database device 692, and client device 694 may each be implemented in whole or in part by various components of a computer system. A particular embodiment illustrating additional components of a computer system that may make up such devices is described below with respect to FIG. 8.

Any of the machines, databases, or devices shown in FIG. 6 may be implemented in a computer operating with a processor executing standardized instruction sets and modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 8. Such a special-purpose computer may operate any number of modules using one or more processors to implement various embodiments described herein for extracting similar elements from a communication.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in the figures may be combined into a single machine, and the functions described herein for any single machine, database, or device may be subdivided among multiple machines, databases, or devices.

Figure 7:
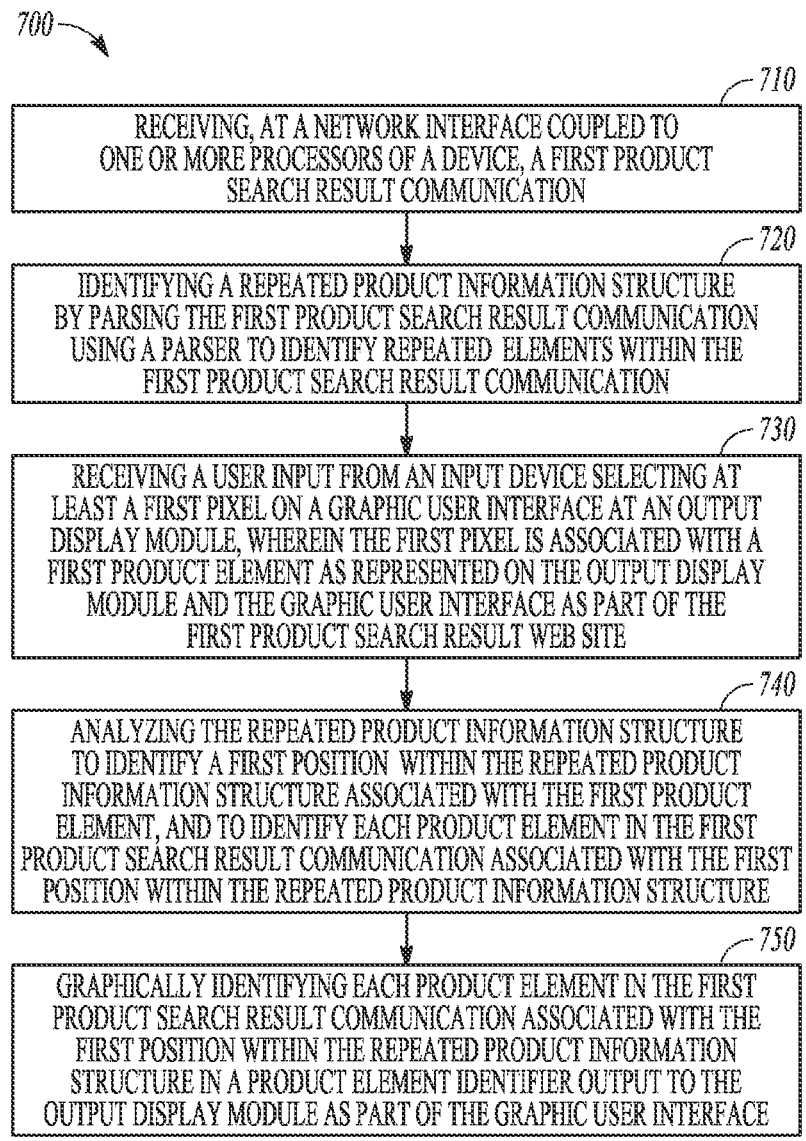
FIG. 7 illustrates a method for extracting group elements according to certain embodiments.

FIG. 7 illustrates a method for extracting group elements, according to certain embodiments. FIG. 7 begins at operation 710 with receiving, at a network interface, a first product search result communication. Such a communication may be similar to the first product search result communication 100. Such a communication may be any other communication or reply communication received by a device.

Operation 720 of FIG. 7 involves identifying a repeated product information structure by parsing the first product search result communication using a parser to identify repeated text elements within the first product search result communication.

Operation 730 involves receiving a user input from an input device selecting at least a first pixel of a graphic user interface. The first pixel is associated with a first product element as represented on a output display module and the graphic user interface as part of the first product search result communication.

Operation 740 involves analyzing the repeated product information structure to identify a first position within the repeated product information structure associated with the first product element, and to identify each product element in the first product search result communication associated with the first position within the repeated product information structure. In certain embodiments, the first position within the repeated product information structure may be a particular instance of a bottom-level position node, such as position node 122(2) of FIG. 2.

Operation 750 involves graphically identifying each product element in the first product search result communication associated with the first position within the repeated product information structure in a product element identifier output to the output display module as part of the graphic user interface.

In certain embodiments, when each product element is graphically identified, a system user may want to adjust an automatically identified repeated product information structure. This may occur, for example, when a user wants elements identified as separate elements to be part of the same element in a generated record. This may also occur when a user identifies an error in the automatic identification of a repeated product information structure. In certain embodiments, the product element identifier output may function as part of a graphic user interface, and a user input adjusting the displayed product element identifier output may be used by the system to adjust the repeated product information structure. Any information in the system may be updated to account for the adjusted repeated product information structure. In certain embodiments, a particular device module or circuit may be associated with this adjustment of the structure. For example, structural analysis module 550 of FIG. 5 may receive an indication from element selection and filtering module 560 in response to a user input to update the identified structure. A supplemental analysis to update the extracted elements may then be performed automatically, or in response to a user input to re-perform the analysis.

Further, various embodiments may include a number of variations. These variations may apply to any device or method described herein. The example embodiments described herein are not exhaustive, but for example, certain embodiments may function where a first position within the repeated product information structure is associated with a cost for each product identified by the first product search result communication.

Automatic processing and generating of a record associated with the identified product elements may include automatic determination of a lowest price, a median price, a highest price, a list of common keywords in descriptive elements, or an average description length, or other such processing.

Certain embodiments may function where the structural analysis module comprises a text parser, and wherein analyzing the first product search result communication to identify the repeated product information structure comprises parsing the first product search result communication using the text parser to identify repeated text elements within the first product search result communication.

Certain embodiments may function where a memory module stores a set of element templates, and where analyzing the first product search result communication to identify the repeated product information structure comprises comparing the repeated text elements within the first product search result communication to the set of element templates and associating a first repeated text element of the repeated text elements with the first position within the repeated product information structure when the first repeated text element matches a first element template of the set of element templates. Such an embodiment may further function where analyzing the first product search result communication to identify the repeated product information structure comprises comparing the repeated text elements within the first product search result communication to the set of element templates and associating a second repeated text element of the repeated text elements with a second position within the repeated product information structure when the first repeated text element matches the first element template of the set of element templates. Still further embodiments may function where the second repeated text element is nested within the first repeated text element of the repeated product information structure.

Additional embodiments may further comprise an output display module that displays a first product search result web site using the first product search result communication. Such embodiments may function where analyzing the first product search result communication to identify the repeated product information structure comprises analyzing a geometric position of each element as displayed on the output display module as part of the first product search result web site and identifying the repeated product information structure from repeated geometric patterns of the first product search result web site as defined by the first product search result communication and displayed on the output display module.

Additional such embodiments may include a user input module coupled to the processor, wherein the user input module comprises an input device and a graphic user interface displayed on the output display module. Such an embodiment may alternatively or additionally function where analyzing the first product search result communication to identify the repeated product information structure comprises receiving one or more user selections via the input device and the graphic user interface identifying one or more repeated product elements as part of the repeated product information structure.

Additional embodiments may function where the target element input comprises a target element template received from the memory module.

Additional embodiments may function where the repeated product information structure comprises a plurality of position nodes and where the plurality of position nodes comprises a top-level position node associated with a first repeated structure within the first product search result communication, and wherein the top-level position node comprises one or more bottom-level position nodes associated with a second repeated structure that occurs within the first repeated structure.

Figure 8:
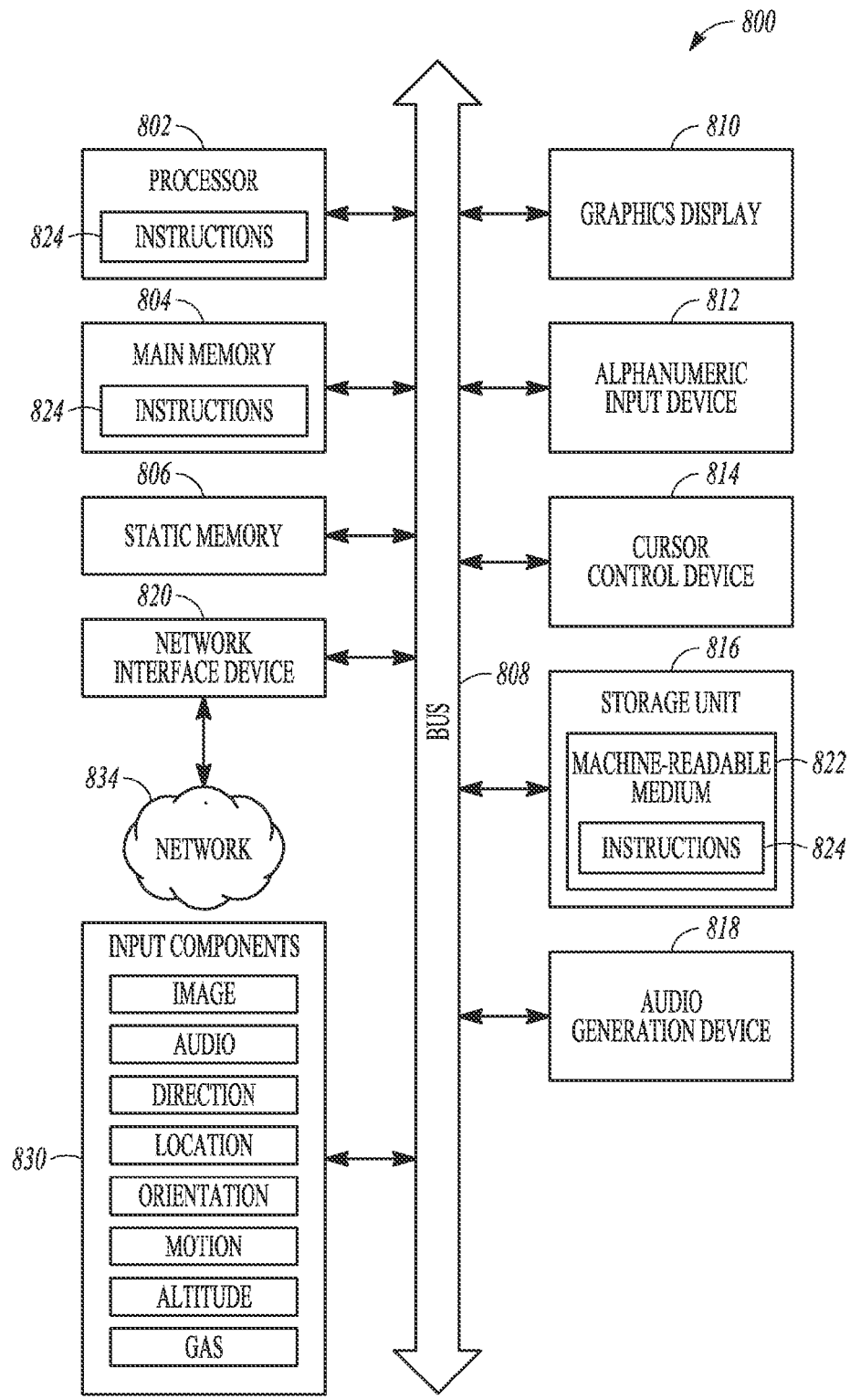
FIG. 8 illustrates a system that may be used to implement various aspects of computing systems which may be part of certain embodiments.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof excluding transitory signals and signals per se) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part. Server 602 can be an example of machine 800. In various embodiments, a machine such as machine 800 may be used to implement any computing device referred to herein, including various client, server, and other devices of FIGS. 5 and 6, or other computing structures which may be used to implement the embodiments described herein.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or another pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media). The instructions 824 may be transmitted or received over the network 834 via the network interface device 820. For example, the network interface device 820 may communicate the instructions 824 using any one or more transfer protocols (e.g., hypertext transfer protocol (HTTP)).

In some example embodiments, the machine 800 may be a portable computing device, such as a smartphone or tablet computer, and may have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," "identifying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

It will be understood that, although the terms "first," "second," etc. may be used herein to describe various elements, these elements should not be limited by these terms. These terms are only used to distinguish one element from another.

What is claimed is:

1. A system comprising:
   one or more processors;
   a network interface coupled to the one or more processors that receives a first product search result communication;
   an output display module that displays a first product search result web site using the first product search result communication;
   a structural analysis module that:
      receives the first product search result communication from the network interface;
      analyzes a geometric position of each of the product elements as displayed on the output display module as part of the first product search result web site; and
      identifies a repeated product information structure from repeated geometric patterns of the first product search result web site as defined by the first product search result communication, wherein each product search result of the plurality of product search results comprises a plurality of product elements, and wherein each of the product elements has a position within the repeated product information structure;
   an element selection and filtering module that receives a target element input identifying a first product element of the first product search result communication, analyzes the repeated product information structure to identify a first position within the repeated product information structure associated with the first product element based on the target element input, analyzes the first product search result communication to identify each product element of the first product search result communication which is in the first position of the repeated product information structure in response to the target element input; and
   a memory module that stores a first record comprising a list of each product element of the first product search result communication which is in the first position of the repeated product information structure.

2. The system of claim 1 wherein the first position within the repeated product information structure is associated with a cost for each of a plurality of products identified by the first product search result communication.

3. The system of claim 1 wherein the structural analysis module comprises a text parser, and wherein analyzing the first product search result communication to identify the repeated product information structure comprises parsing the first product search result communication using the text parser to identify repeated text elements within the first product search result communication.

4. The system of claim 3 wherein the memory module stores a set of element templates; and
   wherein analyzing the first product search result communication to identify the repeated product information structure comprises:
   comparing the repeated text elements within the first product search result communication to the set of element templates; and
   associating a first repeated text element of the repeated text elements with the first position within the repeated product information structure when the first repeated text element matches a first element template of the set of element templates.

5. The system of claim 4 wherein analyzing the first product search result communication to identify the repeated product information structure comprises:
   comparing the repeated text elements within the first product search result communication to the set of element templates; and
   associating a second repeated text element of the repeated text elements with a second position within the repeated product information structure when the first repeated text element matches the first element template of the set of element templates.

6. The system of claim 1 wherein the second repeated text element is nested within the first repeated text element of the repeated product information structure.

7. The system of claim 1 further comprising a user input module coupled to the processor, wherein the user input module comprises an input device and a graphic user interface displayed on the output display module.

8. The system of claim 7 wherein the target element input comprises a user input from the input device, wherein the user input selects a first record comprising a list of each product element of the first product search result communication which is in the first position of the repeated product information structure.

9. The system of claim 7 wherein analyzing the first product search result communication to identify the repeated product information structure comprises receiving one or more user selections via the input device and the graphic user interface identifying one or more repeated product elements as part of the repeated product information structure.

10. The system of claim 1 wherein the target element input comprises a target element template received from the memory module.

11. A device comprising:
   means for receiving a first product search result communication;
   an output display module that displays a first product search result web site using the first product search result communication;
   a structural analysis module that:
      analyzes a geometric position of each of the product elements as displayed on the output display module as part of the first product search result web site; and
      identifies a repeated product information structure from repeated geometric patterns of the first product search result web site as defined by the first product search result communication wherein each product search result of the plurality of product search results comprises a plurality of product elements, and wherein each of the product elements has a position within the repeated product information structure;
   means for receiving a target element input, wherein the target element input identifies a first product element at a first position within the repeated product information structure;
   means for, in response to receipt of the target element input, identifying a plurality of elements in the first product search result communication which are at the first position within the repeated product information structure; and
   means for storing a first record comprising the plurality of elements in the first product search result communication which are at the first position within the repeated product information structure.

12. The device of claim 11 further comprising:
   means for displaying a first product search result web site based on the first product search result communication.

13. The device of claim 11 further comprising:
   means for adjusting the repeated product information structure in response to a user input.

14. A method comprising:
   receiving, at a network interface coupled to one or more processors of a device, a first product search result communication;
   analyzing, by the device, a geometric position of each of the product elements as identified by the first product result communication;
   identifying, by the device, a repeated product information structure from repeated geometric patterns of the first product search result communication, wherein each product search result of the plurality of product search results comprises a plurality of product elements, and wherein each of the product elements has a position within the repeated product information structure;
   receiving a target element input identifying a first product element of the first product search result communication;
   analyzing, in response to receipt of the target element input, the repeated product information structure to identify a first position within the repeated product information structure associated with the first product element based on the target element input;
   analyzing the first product search result communication to identify each product element of the first product search result communication which is in the first position of the repeated product information structure; and
   storing a first record comprising a list of each product element of the first product search result communication which is in the first position of the repeated product information structure.

15. The method of claim 14 wherein the repeated product information structure comprises a plurality of position nodes; and
   wherein the plurality of position nodes comprises a top-level position node associated with a first repeated structure within the first product search result communication, and wherein the top-level position node comprises one or more bottom-level position nodes associated with a second repeated structure that occurs within the first repeated structure.

16. The method of claim 15 wherein the target element input comprises a user input received at a touchscreen of the device.

17. The method of claim 16 wherein the target element input identifies a group of pixels displayed as part of a user interface outputting the first product search result communication; and
   wherein identification of each product element of the first product search result communication which is in the first position of the repeated product information structure is based on the group of pixels identified by the target element input.

* * * * *